M. R. JONES.
Subsoil-Plow.
No. 69,099.
Patented Sept. 24. 1867.
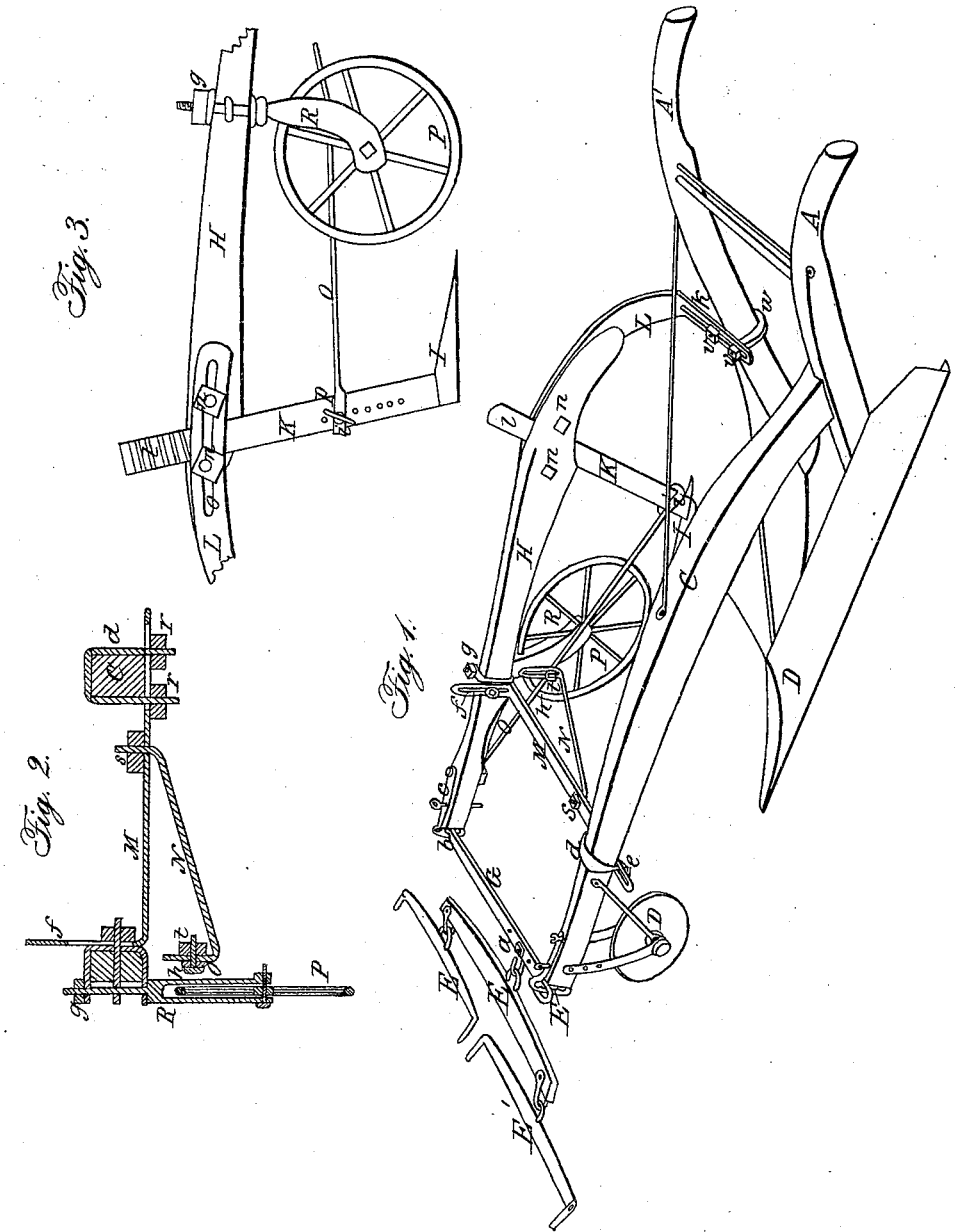
Witnesses:
Sylvanus D. Locke
J. M. May.
Inventor:
Marquis R Jones

United States Patent Office.

MARQUIS R. JONES, OF BRADFORD, WISCONSIN.

*Letters Patent No. 69,099, dated September 24, 1867.*

IMPROVEMENT IN SUBSOIL PLOUGHS.

The Schedule referred to in these Letters Patent and making part of the same.

Be it known that I, MARQUIS R. JONES, of Bradford, in Rock county, in the State of Wisconsin, have invented a new and useful Improvement in Subsoil Ploughs, and the mode of using them with the common farm plough; and I do hereby declare that the following is a full and exact description thereof, reference being had to the annexed or accompanying drawings, and the letters of reference marked thereon, the same letter of reference representing the same part in each drawing.

The nature of my invention consists in arranging for use a subsoil plough by the side of a common plough, so that the subsoil is lifted directly behind the horse that travels in the preceding furrow, and directly before the furrow that is being turned, whereby the furrow-horse and the ploughman have a hard furrow to walk in, and wholly obviates the trampling down the earth by both the ploughman and furrow-horse, as is the case when the subsoil plough follows immediately after the common plough. Also, by my arrangement in placing the subsoil plough near the team, the subsoiler is more easily drawn. Also, by the use of a caster-wheel I make the plough and subsoiler self-holding. Also, by my equalizer I apply all the power to the work to be done without material loss; and also in the readiness with which the subsoiler is attached or detached, and placed nearer or farther from a common plough when in use, and in regulating the depth it is desired that the subsoiler should run.

Figure 1 is a perspective view of a common plough and subsoil plough combined.

Figure 2 is a vertical cross-section at the point of connecting the beams of both ploughs and the adjustable bar, and Figure 3 is a section giving a view of the subsoil plough and standard or coulter-bar, beam, and caster-wheel, reversed from fig. 1.

A and A' are the handles, B is the land-side and mould-board, and C is the beam. D is the gauge-wheel, and E is the clevis of the common plough. F is the double-tree, and F' and F' are single-trees, all connected with the equalizing-bar G by the hook or clevis $a$. Two or more horses or other team may be used. The equalizing-bar has one end connected to the clevis E, and the other end is connected to clevis $c$ of the subsoil plough-beam by means of notches $b$, so that as the beams C and H are brought together or placed further apart the equalizing-bar can be adjusted properly and the beams kept substantially parallel with each other. By means of holes in the bar the clevis $a$ may be so placed as to bring the draught of the two ploughs in line relatively with the power applied, and thus avoid lateral pressure. I is the subsoil plough, in the form somewhat of a double share, and so formed in its centre and highest part that it lifts the soil and lets it fall as it passes along, making it loose and light, and also furnishes drainage to some extent. The subsoil plough may be made in any of the approved forms, though I prefer that above described. To the lower end of the standard K is fastened rigidly the plough. A few inches of its front edge above the plough is made sharp like a coulter. The slotted bar L, with bolts $n\ n$, holds the standard K to the beam H, and allows the standard to be moved up or down, backward or forward, as may be necessary. The other end of the bar is curved and bent, as shown, and is provided with a slot at $k$, by which, with the clip $u$ and nuts $v\ v$, it is made adjustable. This, with the slot $e$ in bar M and clip $d$, by which to attach to beam C, enables the ploughman to adjust beam H at the proper distance from and parallel with beam C, while the slot $f$ in bar M, and slot at $h$ in brace N, together with the clip $u$ on the handle A', allows the beam H to be raised and lowered, as may be required. By clip $u$ on the handle A', the draught-bar O and the bar L, the subsoil plough I and standard K, are made adjustable as the work to be done may require. It will also be seen that by the thumb-screw $p$ in the loop $i$ that encloses the standard, and the countersunk holes in the side of the standard to receive the point of the thumb-screw, the draught-rod may be adjusted on the standard, and by the inch marks $l$, or other division of the spaces on the side of the standard, the depth of the subsoil plough may be accurately gauged. P, the caster gauge-wheel on its revolving stem R, runs in the hard bottom of the furrow, directly in the rear of the horse that travels in the furrow, and directly forward of the subsoil plough, and, with the gauge-wheel D, makes the whole self-holding and of easy draught.

I may observe that I deem the running the subsoil plough after the horse that walks in the furrow, and directly before the furrow-slice of the common plough as it is being turned, of very great importance, inasmuch as it, first, makes the draught light, as it brings the work nearer the team; second, it prevents the trampling down the earth lifted and loosened by the subsoil plough, as is the case when the subsoil plough is placed directly in the rear of the common plough, by the ploughman following his plough, and then again by the horse in the next "bout," as he follows and walks in the furrow, by which a large part of the value of subsoil ploughing is wholly lost; and, third, by my invention, both ploughman and horse have a hard furrow bottom to walk in, giving to both greater efficiency and endurance, and an increased amount of work daily performed.

I do not claim a subsoil plough *per se*, nor a standard with a sharp-edged coulter form, nor do I claim a caster-wheel independently of the manner of using it; but what I do claim as my invention, and desire to secure by Letters Patent, is—

1. A subsoil plough combined with a common plough, so that the bottom of the preceding furrow may be ploughed by the subsoil plough immediately forward of the furrow-slice that is being turned by the common plough, substantially as and for the purposes described.

2. Subsoil plough I, shank K, with countersinks therein, substantially as described, thumb-screw $p$, bar L, draught-rod O, and beam H, when the whole are connected together and used substantially as and for the purposes described.

3. Beams C and H, in combination with the devices L, $k$, and $u$, and M, $d$, and $e$, and the equalizing-bar G, for the purpose of adjusting the distance between C and H, substantially as and for the purposes described.

4. A general arrangement and combination of the parts P, D, G, H, K, C, I, M, and O, when the whole are connected together and used substantially as and for the purposes described.

MARQUIS R. JONES.

Witnesses:
J. M. MAY,
S. S. ST. JOHN.